Patented July 6, 1954

2,683,164

UNITED STATES PATENT OFFICE 2,683,164

PREPARATION OF 1,2,6-HEXANETRIOL TRINITRATE

Jesse B. Bronstein, Jr., Allentown, Pa., assignor to Trojan Powder Company, a corporation of New York No Drawing. Application December 21, 1951, Serial No. 262,885

1 Claim. (Cl. 260—467)

My invention relates to the new chemical product 1,2,6-hexanetriol trinitrate and to explosive compositions containing this material as a component.

Commercial 1,2,6-hexanetriol is a known material, but efforts to prepare nitrates of this material have been unsuccessful, as the product obtained when commercial 1,2,6-hexanetriol is added to nitrating acid is highly unstable, and either ignites spontaneously or decomposes rapidly as the two reactant materials are brought together. This behavior has led to the belief that it is either not possible to make 1,2,6-hexanetriol trinitrate, or that if this material can be made is so unstable that it cannot exist without decomposition at room temperatures.

I have discovered that the behavior previously noted when commercial 1,2,6-hexanetriol is reacted with nitrating acid is due to some impurity, the nature of which is unknown to me, and which is present in commercial 1,2,6-hexanetriol in relatively small amounts. I have discovered that upon removing this impurity from commercial 1,2,6-hexanetriol, the hexanetriol may then be nitrated without ignition or decomposition, and gives a product that is relatively stable not only at room temperature, but even at an elevated temperature such as 100° C.

In the purification of commercial 1,2,6-hexanetriol I employ relatively slow distillation under reduced pressure, and preferably I employ distillation at pressures not in excess of that corresponding to 5 mm. of mercury. When the distillation is made slowly, and with careful regulation of the pressure, a single distillation may give a product that will not ignite or decompose on nitration, but I prefer to doubly distill at a pressure not in excess of the pressure corresponding to 5 mm. of mercury and to be absolutely sure of a product that will nitrate, I prefer to make three separate fractional distillations. By a double distillation I obtain a product having a boiling point of 175–178° C. at 5 mm. pressure, and which material is water white in color, and is almost free of odor, and which does not possess the characteristic aromatic odor of commercial 1,2,6-hexanetriol.

The product so obtained has an hydroxyl value that varies slightly with different runs, but which averages 36.95%.

I nitrate this purified product at around 0° C. in nitrating acid that is preferably of the composition

| | Per cent |
|---|---|
| Sulfuric acid | 58.00 |
| Nitric acid | 40.30 |
| Water | 1.70 | maintaining the temperature throughout the nitration at from −5° C. to +1° C. The purified hexanetriol is added slowly to the cooled nitrating acid with careful stirring, and preferably using a ratio of 1 part of 1,2,6-hexanetriol to 6 parts of nitrating acid. The time of feeding the 1,2,6-hexanetriol to the nitrating acid may vary from one hour to 1½ hours, and I prefer to continue stirring for about 1 hour after all of the 1,2,6-hexanetriol has been added. When conducted as above, there is no evidence of ignition or decomposition during the addition of the 1,2,6-hexanetriol nor during the the period of stirring. The nitrated charge is preferably drowned by being run into three times its volume of ice water with efficient stirring.

The 1,2,6-hexanetriol trinitrate separates as a heavy, tan-colored lower layer in the drowning water, and is then separated from the overlying diluted nitrating acid and is washed several times with water and then neutralized by a further wash with a 1% solution of sodium bicarbonate, this bicarbonate wash being repeated several times and the washed and neutralized nitrated product being then carefully washed with water to remove any excess sodium bicarbonate. The nitrated product is then dried by vacuum desiccation, and then shows a nitrogen content of 15.36% and has a light tan color.

This product shows good stability both at room temperatures and at somewhat elevated temperatures. When heated in a standard stability tube (11 mm. × 75 mm.) at 100° C., the product shows an average loss of not over 0.2% after being heated for 1 hour (and which may represent adsorbed moisture) and shows a loss in weight of less than 1% after being continuously heated for 48 hours at 100° C. The product does not ignite or explode after being continuously heated at 100° C. for 100 hours, and shows a loss in weight of less than 1.5% when so heated for 100 hours.

I have found that the 1,2,6-hexanetriol trinitrate made in accordance with my present invention has valuable properties when incorporated in explosive compositions, and may be used as a substitute, wholly or in part, for nitroglycerin, and when admixed with nitroglycerin in dynamite acts as a freezing point depressant for the nitroglycerin. It should be noted that when used as a freezing point depressant for nitroglycerin, it has a double action, being itself an explosive and also serving to materially reduce the temperature to which the nitroglycerin may be exposed without freezing.

1,2,6-hexanetriol trinitrate may be used in the formulation of both propellant compositions and explosive compositions. When formulated in explosive compositions such as dynamite, gelatin dynamite, and the like, it may be used admixed with nitroglycerin, or alone as a substitute for nitroglycerin. It may similarly be used in propellant compositions with nitrocellulose of from 12.85% to 13.35% nitrogen, to form smokeless propellant compositions of the cordite type.

My invention is not limited to the specific examples herein disclosed, but is of broad application, and it will accordingly be understood that I am not to be limited in the scope of my invention except as indicated in the following claim.

I claim:

In making 1,2,6-hexanetriol trinitrate, the method which comprises distilling 1,2,6-hexanetriol in vacuo, collecting a fraction boiling within the range 175°–178° C. at approximately 5 mm. of mercury pressure, mixing the said fraction alone with a nitrating mixture of sulfuric and nitric acid at a temperature approximately within the range —5° to 1° C., and maintaining the resulting mixture under nitrating conditions until nitration is substantially complete.

References Cited in the file of this patent

UNITED STATES PATENTS

| Number | Name | Date |
| --- | --- | --- |
| 1,213,369 | Hibbert | Jan. 23, 1917 |
| 2,066,506 | Woodbury et al. | Jan. 5, 1937 |
| 2,139,364 | Groll | Dec. 6, 1938 |